United States Patent [19]

D'Alba

[11] Patent Number: 4,716,612
[45] Date of Patent: Jan. 5, 1988

[54] WIPER ARM ASSEMBLY

[75] Inventor: Anthony R. D'Alba, Amherst, N.Y.

[73] Assignee: Trico Products Corp., Buffalo, N.Y.

[21] Appl. No.: 836,859

[22] Filed: Mar. 6, 1986

[51] Int. Cl.$^4$ .............................................. B60S 1/34
[52] U.S. Cl. .................................................. 15/250.23
[58] Field of Search ............ 15/250.21, 250.23, 250.35

[56] References Cited

U.S. PATENT DOCUMENTS

| | | | |
|---|---|---|---|
| 2,079,399 | 5/1937 | Drew et al. | 15/250.23 |
| 2,483,242 | 9/1949 | Smulski | 15/250.23 |
| 2,537,411 | 1/1951 | Klinger | 15/250.23 |
| 3,010,137 | 11/1961 | Krohm | 15/250.21 |
| 3,035,296 | 5/1962 | Deibel | 15/250.23 |
| 3,404,423 | 10/1968 | Howard et al. | 15/250.23 |

Primary Examiner—Peter Feldman
Attorney, Agent, or Firm—E. Herbert Liss

[57] ABSTRACT

A primary wiper arm includes a mounting head for securing the inner end to a pivot shaft, the outer end being pivotally secured to a pivot block. A drag link includes a ring bearing and a disk journaled in the ring bearing having mating spherical concave and convex surfaces respectively. This disk is mounted at the pivot shaft bearing housing eccentrially to the logitudinal axis of the pivot shaft. At its outer end the drag link is connected to the pivot block at a point spaced from the connection between the primary arm and the pivot block. A connector is provided for securing the blade to the pivot block. The arrangement effects relative angular movement between blade and arm assembly and permits gyrating movement of the drag link.

5 Claims, 3 Drawing Figures

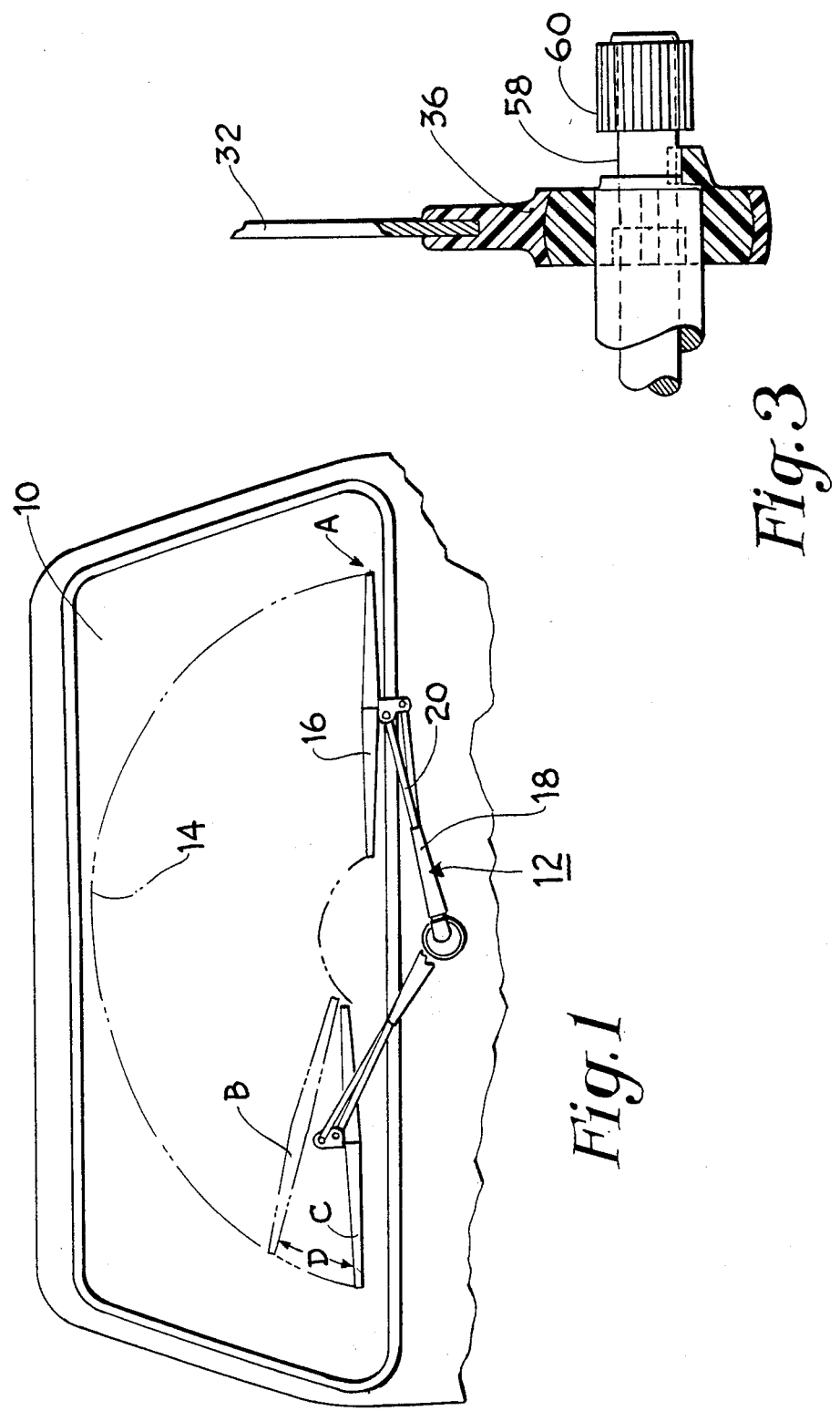

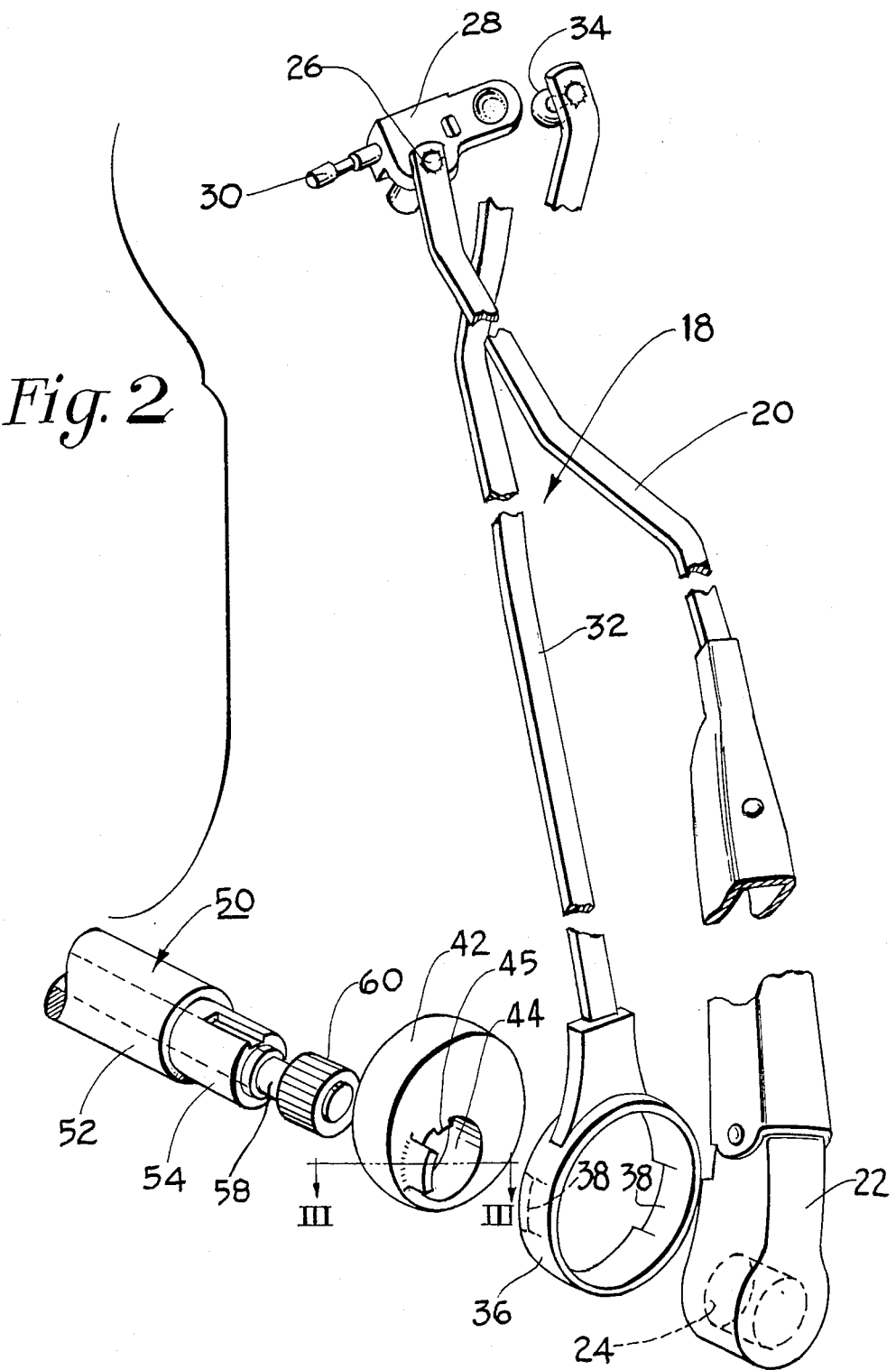

WIPER ARM ASSEMBLY

BACKGROUND OF THE INVENTION

The present invention relates to an improved Windshield wiper arm for motor vehicles and, more particularly, to a windshield wiper arm in which a blade attached thereto pivots relative to the arm as the wiper traverses its path.

With present wiper arms currently in general use a substantial angular portion of the viewing area of the windshield is left unwiped because the longitutinal axis of the blade is held fixed with respect to the longititutional axis of the arm. Wiper arms like that of the present invention, which provide compound oscillating movement of the blade are known in the prior Art and are currently in use. One such is disclosed in U.S. Pat. No. 3,247,540 by S. J. Howard et al, issued Apr. 26, 1966. With certain applications it is essential that a drag link for producing compound motion be secured so close to the pivot shaft or even within the radius of the pivot shaft so that there will be interference between the drag link and the primary wiper arm. This problem is overcome in U.S. Pat. No. 3,404,423 to S. J. Howard et al, Oct. 8, 1968 by mounting a disk on the pivot shaft housing eccentrically to the pivot shaft and journaling said disk in a bearing ring secured to the inner end of the drag link. This enables the oscillating axis of the drag link to be very close to the pivot shaft or even within the radius of the pivot shaft. However, as the wiper traverses its wiping path the curvatures of modern windshield causes the drag link to gyrate. The Howard et al. U.S. Pat. No. 3,404,423 has no provision for freeing the drag link for gyrating motion.

SUMMARY OF THE INVENTION

The present invention is an improvement over the S. J. Howard et al. U.S. Pat. No. 3,404,423; it is provided with a bearing ring at the end of the drag link and a disk journaled within the bearing ring. The internal surface of the bearing ring is of concave spherical configuration; the external surface of the disk is of complementary convex spherical configuration and includes an eccentric opening for mounting on the pivot shaft. The disk may be slidably keyed to the pivot shaft housing thereby fixing its angular position and facilitating removal and replacement of the arm assembly. The mating concave and convex spherical surfaces at the anchoring end of the drag link coupled with a ball and socket joint connection at the pivot block permits gyrating movement of the drag link.

The primary object of the present invention is to provide an improved compound oscillating wiper assembly wherein the drag link has freedom to undergo gyrating movement.

Another object of the invention is to provide a compound oscillating wiper arm assembly for facilitating removal and replacement.

A further object of the intention is to provide an improved compound oscillating wiper assembly utilizing a unitized bearing ring and disk anchoring arrangement.

Other objects and advantages of the invention will be apparent from the following detailed description taken in connection with the accompanying drawings.

BRIEF DESCRIPTION OF DRAWINGS

FIG. 1. is an elevation view of the rear window of a motor vehicle incorporating the wiper arm of the invention;

FIG. 2. is a perspective view of a wiper arm illustrating the anchoring end in exploded perspective; and FIG. 3. is a partial side elevation view with the anchoring end of the drag link shown in lateral cross section taken on line III—III of FIG. 2.

DETAILED DESCRIPTION

In FIG. 1 is shown the rear window 10 of a motor vehicle having a single wiper arm and blade assembly 12 which traverses a path 14 as it oscillates to and fro across the window. The wiper blade and arm assembly 12 includes a wiper blade 16 and a wiper arm assembly 18. The wiper arm assembly 18 comprises a primary arm 20; a mounting head 22 is pivotally secured to the inner end of arm 20 on a transverse axis and includes a knurled recess 24. The primary arm 20 is pivotally secured at its outer end as at 26 to a pivot block 28. The pivot block carries means for mounting a wiper blade and as illustrated it comprises a cantilever type recessed pin 30 for a side mounted wiper blade 16 as shown in FIG. 1.

A drag link 32 is secured to the pivot block 28 by a ball and socket joint 34 spaced from the pivotal axis 26 of the primary arm 20. A bearing ring 36 is fixed to the drag link 32 at its inner end.

As illustrated in the drawings the bearing ring 36 is of suitable hard plastic material but may be of any suitable or desirable material of sufficient rigidity having anti-friction characteristics on its internal surface. The internal surface of the bearing ring is of concave spherical configuration and has formed therein a pair of diametrically opposed ramps which slope inwardly and merge with the outermost diameter of the spherical internal surface. A disk 40 includes a convex spherical periphery complementary with the concave spherical surface of the bearing ring 36; it includes an eccentric opening 44 which extends axially through the disk. A radially extending key 45 is formed axially across the sidewall of the opening 44. A spacing lug 46 projects in an axial direction from the flat surface of this disk 40. The disk 40 may be inserted into position in the bearing ring by orienting it with its axis perpendicular to the axis of the bearing ring and aligning the disk with the ramps 38 and then rotating the disk to a position where its central axis is coincident with the central axis of the bearing ring 36. The disk is illustrated by way of example as being of plastic material. Other suitable or desirable rigid material may be employed. It is essential that the convex surface 42 be of suitable anti-friction material. The disk and bearing ring constitute anchoring means for fixing the drag link at the pivot shaft.

A pivot shaft assembly 50 (shown in fragment) is adapted to carry the wiper arm assembly 18 of the invention. The pivot shaft assembly includes a pivot shaft bearing housing 52 having a cylindrical reduced end portion 54 which includes an axially extending keyway 56 on the outer surface for accommodating key 45 in the disk opening 44. Positioned within the bearing housing 52 is a pivot shaft 58 having a knurled driving head 60 at its free end.

To assemble the wiper arm assembly 18 on the pivot shaft for operation the opening 44 in disk 40 is slipped over the driving head 60; the key 45 is aligned with the keyway 56. The opening 44 frictionally engages the outer surface of the reduced portion 56 of a pivot shaft bearing housing 52. The knurled recess 24 in the mounting head 22 is then slipped onto the knurled driving head 60. A latching mechanism (not shown) may be provided on the mounting head to prevent displacement from the driving head 60. In the fully mounted position the disk 40 is fixed in its angular position with respect to the pivot shaft housing; the bearing ring is universally moveable relative to the disk as a result of the abutting complementary spherical surfaces. The engagement of the knurled recess in the mounting head with the knurled driving head on the pivot shaft effects oscillation of the wiper arm when the pivot shaft is oscillated by a source of power (not shown).

It will be apparent that depending upon the eccentricity of the disk 40 relative to the central axis of the pivot shaft the rotational axis of the bearing ring and therefore the drag link can be as close as required to the pivot shaft or even within the radius of the pivot shaft if necessary.

Referring to FIG. 1. the Wiper arm and blade assembly 12 is shown at A in parked position. Assuming that the angular position of the blade was fixed relative to the primary wiper arm 20—at the end of its stroke the blade would be positioned as shown in chain lines at B. However, the eccentricity of the disk 40 cause the drag link to move to and fro in the direction of its longitudinal axis as the pivot shaft oscillates the primary arm 20. Movement of the drag link 32 in turn causes the pivot block 28 to oscillate relative to arm 20 about axis 26. Thus the blade 16 oscillates with the pivot block 28, thereby producing angular motion of the wiper blade relative to the primary arm 20. This motion results in the blade 16 being moved to the position C at the end of its stroke resulting in an additional angular area represented by the angle a being wiped.

It should now be apparent that a compound oscillating wiper arm assembly has been provided which offers versatility in utilization by providing a means to maximize the wiping pattern in accordance with the parameters of the vehicle upon which it is to be mounted. It permits gyration of the drag link to accommodate varying windshield curvature. It also facilitates removal and replacement of the relatively complex wiper arm assembly.

Although a certain specific embodiment of the invention has been shown and described for the purpose of illustration it will be apparent that various modifications and other embodiments are possible within the scope of the invention. For example, other and different materials may be employed other and different mounting head assemblies for the primary arm may be used; an alternative arrangement to the keyway attachment between the disk 40 and pivot bearing portion 54 maybe utilized as for example a polygonal opening in the disk and a corresponding polygonal periphery on the bearing housing; different arm attaching means may be employed.

It is to be understood, therefore, that the invention is not limited to the specific arrangement shown but in its broadest aspects it includes all equivalent embodiments and modification which come within the scope of the invention.

What is claimed is:

1. In a windshield wiper arm assembly comprising a pivot block, a primary arm pivotally secured to said pivot block at one end on an axis perpendicular to the major plane of the pivot block, means at its other end for securement to a driven oscillatory pivot shaft for pivotal movement about its central axis, said pivot shaft being journalled within a bearing housing, a drag link secured for universal movement at one end to said pivot block and spaced from said axis, said drag link having anchoring means at its other end for connecting said drag link at said pivot shaft for universal movement and means for connecting a wiper blade to said pivot block for movement therewith; wherein said anchoring means comprises a disk of greater diameter than said pivot shaft having a convex sperical periphery and an eccentrically positioned axially extending opening of greater radial extent than said pivot shaft, said opening encircling said pivot shaft and said bearing housing and being frictionally engageable with said bearing housing, readily releasable engaging means for fixing the angular position of said disk relative to said housing, the central axis of said disk being displaced from the central axis of said pivot shaft, a bearing ring of rigid material having an internal spherical concave surface complementary to said covex spherical periphery fixed to the other end of said drag link and engaging said convex spherical periphery for free, unobstructed univeral movement, whereby said central axis of said disk may lie close to or within the radial extent of said pivot shaft and avoid interference between said pivot shaft and said drag link during movement in any direction.

2. In a windshield wiper arm assembly according to claim 1 wherein said pivot shaft includes a free end extending outwardly from said bearing housing, a driving head at said free end of said pivot shaft and a recessed mounting head at the inner end of said primary arm for engaging said mounting head and a spacing lug on said disk extending axially toward said driving head for maintaining said disk in position on said bearing housing and spaced from said mounting head.

3. In a windshield wiper arm assembly according to claim 1 wherein said bearing ring includes a pair of diametrically opposed, axially extending ramped grooves merging with said internal spherical surface at its outermost diameter for facilating insertion of said disk within said bearing ring.

4. In a windshield wiper arm assembly according to claim 1 wherein said releasable means for fixing the angular position of said disk relative to said bearing housing comprises a mating axially extending key and an open ended key way at said bearing housing in said opening.

5. In a windshield wiper arm assembly comprising a pivot block, a primary arm pivotally secured to said pivot block at one end, means at its other end for securement to an oscillatory pivot shaft, said pivot shaft being journaled within a bearing housing, a drag link secured for universal movement at one end to said pivot block and spaced from the connection between the primary arm and the pivot block, said drag link having anchoring means at its other end for connecting said drag link at said pivot shaft for universal movement and means for connecting a wiper blade to said pivot block for movement therewith; wherein said anchoring means comprises a bearing ring having an internal concave spherical bearing surface and a disk journaled within said bearing ring having a convex external spherical surface complementary with said internal spherical surface, a pair of diametrically opposed, axially extending ramped gooves formed in said internal spherical surface, an eccentrially positioned opening in said disk having an axially extending key positioned to engage an axially extending keyway on said bearing housing, said primary arm being mounted to overlie said drag link and spacer means extending between said disk and said primary arm.

* * * * *